US011893671B2

(12) United States Patent
Sagar et al.

(10) Patent No.: US 11,893,671 B2
(45) Date of Patent: Feb. 6, 2024

(54) IMAGE REGULARIZATION AND RETARGETING SYSTEM (71) Applicant: Sony Interactive Entertainment LLC, San Mateo, CA (US)

(72) Inventors: Mark Andrew Sagar, Auckland (NZ); Tim Szu-Hsien Wu, Auckland Central (NZ); Frank Filipe Bonniwell, San Marcos, CA (US); Homoud B. Alkouh, San Diego, CA (US); Colin Joseph Hodges, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/028,865

(22) Filed: Sep. 22, 2020

(65) Prior Publication Data
US 2022/0092837 A1 Mar. 24, 2022

Related U.S. Application Data (63) Continuation of application No. 15/913,825, filed on Mar. 6, 2018, now Pat. No. 10,783,690, which is a
(Continued)

(30) Foreign Application Priority Data
Sep. 7, 2015 (NZ) ........................................ 711968

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/251* (2017.01); *G06V 10/98* (2022.01); *G06V 20/40* (2022.01); *G06T 2207/10016* (2013.01)

(58) Field of Classification Search
CPC ..................... G06T 13/40; G06T 7/251; G06T 2207/10016; G06V 10/98; G06V 20/40
(Continued)

(56) References Cited

U.S. PATENT DOCUMENTS 8,390,628 B2  3/2013 Harding et al.
10,783,690 B2  9/2020 Sagar
(Continued)

FOREIGN PATENT DOCUMENTS

JP    2003-44873    2/2003
JP    2009-70380    4/2009
(Continued)

OTHER PUBLICATIONS

Lewis, J.P. et al.; "Practice and Theory of Blendshape Facial Models", Eurographics 2014, State of the Art Report, Jan. 1, 2014, p. 1-20.
(Continued)

*Primary Examiner* — James A Thompson
*Assistant Examiner* — Kim Thanh T Tran
(74) *Attorney, Agent, or Firm* — Polsinelli LLP (57) ABSTRACT

Systems and methods for image retargeting are provided. Image data may be acquired that includes motion capture data indicative of motion of a plurality of markers disposed on a surface of a first subject. Each of the markers may be associated with a respective location on the first subject. A plurality of blendshapes may be calculated for the motion capture data based on a configuration of the markers. An error function may be identified for the plurality of blendshapes, and it may be determined that the plurality of
(Continued)

blendshapes can be used to retarget a second subject based on the error function. The plurality of blendshapes may then be applied to a second subject to generate a new animation.

21 Claims, 5 Drawing Sheets

Related U.S. Application Data continuation of application No. PCT/US2016/050575, filed on Sep. 7, 2016.

(51) Int. Cl.
*G06V 10/98* (2022.01)
*G06V 20/40* (2022.01)

(58) Field of Classification Search
USPC .......................................................... 345/473
See application file for complete search history.

(56) References Cited

U.S. PATENT DOCUMENTS

| | | | | |
|---|---|---|---|---|
| 2004/0095344 | A1* | 5/2004 | Dojyun | G06T 13/40 345/419 |
| 2006/0267978 | A1* | 11/2006 | Litke | G06T 17/20 345/419 |
| 2008/0024505 | A1 | 1/2008 | Gordon et al. | |
| 2008/0181508 | A1* | 7/2008 | Kaneda | G06V 40/175 382/190 |
| 2009/0066700 | A1* | 3/2009 | Harding | G06T 7/251 345/473 |
| 2014/0035929 | A1 | 2/2014 | Matthews et al. | |
| 2014/0085315 | A1* | 3/2014 | Koperwas | G06K 9/6255 345/474 |
| 2014/0198107 | A1 | 7/2014 | Thomaszewski et al. | |
| 2014/0362091 | A1* | 12/2014 | Bouaziz | G06V 40/176 345/473 |
| 2015/0042743 | A1 | 2/2015 | Cullen | |
| 2015/0169938 | A1 | 6/2015 | Yao et al. | |
| 2016/0328875 | A1 | 11/2016 | Fang et al. | |
| 2016/0350958 | A1 | 12/2016 | Bouaziz et al. | |
| 2018/0197322 | A1 | 7/2018 | Sagar | |

FOREIGN PATENT DOCUMENTS

| | | |
|---|---|---|
| JP | 2014-522058 | 8/2014 |
| JP | 2018-532216 | 11/2018 |
| JP | 2022-028791 | 2/2022 |
| WO | WO 2017/044499 | 3/2017 |

OTHER PUBLICATIONS

Li, Linghua et al.; "A Survey of Computer Facial Animation Techniques", 2012 International Conference on Computer Science and Electronics Engineering, Mar. 23, 2012, p. 434-438.
Ravikumar et al., Shridhar; "Reading Between The Dots: Combining 3D Markers and FACS Classification for High-Quality Blendshape Facial Animation", Graphics Interface Conference 2005: Proceedings; Victoria, British Columbia, May 9-11, 2005 p. 143-151.
European Patent Application No. 16844985.8 Extended European Search Report dated Mar. 6, 2019.
Japanese Patent Application No. 2018-531312 Non-Final Notification of Reasons for Refusal dated Oct. 1, 2020.
PCT Application PCT/US2016/050575 International Preliminary Report on Patentability dated Mar. 13, 2018.
PCT Application PCT/US2016/050575 International Search Report and Written Opinion dated Feb. 3, 2017.
U.S. Appl. No. 15/913,825 Final Office Action dated Nov. 12, 2019.
U.S. Appl. No. 15/913,825 Office Action dated May 2, 2019.
Japanese Patent Application No. 2018-531312 Decision of Refusal dated Jul. 13, 2021.

* cited by examiner

IMAGE REGULARIZATION AND RETARGETING SYSTEM

CROSS-REFERENCE TO RELATED APPLICATIONS

The present patent application is a continuation of U.S. patent application Ser. No. 15/913,825 filed Mar. 6, 2018, now U.S. Pat. No. 10,783,690, which is a continuation of International Application No. PCT/US16/50575 filed Sep. 7, 2016, which claims the priority benefit of New Zealand patent application number 711,968 filed Sep. 7, 2015, the disclosures of which are incorporated herein by reference.

BACKGROUND OF THE INVENTION

1. Field of the Invention

The present invention relates generally to computer-generated graphics, and more specifically to the generation of 3D characters for use in animation.

2. Description of Related Art

Three-dimensional animation using computer-generated images ("CGI") has evolved to take advantage of increased computing power, but still presents serious challenges in the creation of realistic depictions of complex geometries. The prior art methods and systems for modeling virtual surfaces have a limited ability to accurately model complex or subtle forms such as human faces. As such, resulting animations are often limited in their effectiveness and ability to convey emotion, natural movement, or other appropriate effects. Part of the challenge in producing convincing animations is that the human brain is extremely sensitive at recognizing and reading emotions based on a variety of different subtle shifts in facial and body language. As a result, even slight deviations from normal movement patterns can lead to a strong sense of unfamiliarity that detracts from the realism of the user experience.

Performance-driven facial animation has been industry-standard for creating realistic animation of human and/or creature faces. In some approaches, the process involves capturing and tracking actors' performances using either 2-D or 3-D cameras, and in retargeting an existing blend-shape rig onto these performances. Such techniques can create realistic facial animations through performance-driven approaches where an actor's performance is transferred onto a target (e.g., virtual) character animation. This process typically consists of four stages: (1) performance capturing; (2) tracking; (3) retargeting; and (4) animation cleanup.

During animation cleanup, an artist removes noise in animation curves by, for example, applying smoothing filters, low-pass filters, and sometimes by fitting individual curves to smooth parameterized functions. Animation cleanup can be a time-consuming and iterative process, and can require a lot of user experience to achieve satisfactory results. Some animation systems employ a large number of markers to improve performance, such as described in U.S. Pat. No. 8,842,933, which is incorporated herein by reference.

SUMMARY OF THE CLAIMED INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The disclosed subject matter relates to a computer-implemented method for image retargeting. Such a method may include steps for acquiring motion capture data based on a plurality of markers disposed on a surface of a first subject, associating each of the markers with a respective location on the first subject, and calculating a plurality of blendshapes for the motion capture data where each of the plurality of blendshapes is based on a configuration of the markers. In some embodiments, the method can further include steps for identifying an error function for the plurality of blendshapes and determining if the plurality of blendshapes can be used to retarget a second subject based on the error function.

Other embodiments of the disclosed subject matter relate to an image retargeting system. Such an image retargeting system may include at least one processor and a memory device storing instructions executable by the at least one processor to cause the image retargeting system to acquire motion capture data regarding a first subject where the motion capture data is based on a plurality of markers disposed on a surface of the first subject, associate each of the markers with a respective location on the first subject, and calculate a plurality of blendshapes for the motion capture data where each of the plurality of blendshapes is based on a configuration of the markers. In some aspects, the processors can be further configured to perform operations to identify an error function for each of the plurality of blendshapes and determine if the plurality of blendshapes can be used to retarget a second subject based on the error function.

In yet another aspect, the disclosed subject matter relates to a computer-readable storage medium storing executable instructions for performing a method of image retargeting as discussed herein.

It is an object of the present invention to at least provide the public or industry with a useful choice in image retargeting.

In a further aspect the present invent consists in a method for retargeting from an image or sequence of images, the method comprising the step of evaluating an error function, the error function comprising a weighted combination of a plurality of shape primitives, wherein at least one of the plurality of shape primitives is based on a physiological characteristic of a subject of the image.

Preferably the method further comprising the steps of: obtaining a body surface using marker points from the body surface of a subject of the image; and generating a representation of the body surface by reference to a group of known body surface positions; wherein the representation is obtained by applying a weight to at least one of the plurality of known body surface positions, wherein the representation is generated from a physiological based energy equation.

Preferably further comprising the step of adjusting the value of the energy equation towards a target value.

Preferably further comprising the step of adjusting the value of the error function towards a target value.

Preferably the method retargets from the image to an animation.

Preferably associating the shape primitives to a target animation; wherein at least one of the plurality of shape primitives is associated with the target animation.

Preferably the retargeting is for use in animation of a body or part thereof.

Preferably the retargeting is for use in facial animation.

Preferably regularization is used for retargeting animation.

Preferably the physiological characteristic is a muscle or collection of muscles.

Preferably the physiological characteristic is an observable feature of the image, animation and/or sequence of images.

Preferably the weighting of at least one of the plurality of shape primitives is based on a probability of activation of the shape primitive.

Preferably the weighting of a plurality of the shape primitives is based on their relative probability of activation.

Preferably the weighted combination has a control factor.

Preferably the method comprises the step of solving the error function with a non-linear solver.

Preferably the shape primitives are basis shapes or action units.

Preferably the weights are adjusted to depend on a previous animation.

Preferably the weights comprise an activation threshold which restricts activation.

Preferably the activation threshold is based, in part, on prior action of the activation.

Preferably the weights are adjusted to have a temporal dependence.

Preferably the method includes the step of updating the temporal dependence of one or more of the plurality of weights.

Preferably the temporal dependence is expressed as a response curve or equation.

Preferably the temporal dependence comprises a restricted rate of change of the shape primitives.

Preferably the rate of change is calculated from experimental data.

Preferably the temporal dependence comprises a difference between the proposed weight and the running average of a weight.

Preferably the image is one of a plurality from a motion capture.

Preferably the image includes a human or a portion of a human.

Preferably the image includes a human face.

Preferably the shape primitives are blendshapes.

In a further aspect the present invent consists in a method for retargeting from an image or a sequence of images, the method comprising the step of evaluating an error function, the error function comprising a weighted combination of a plurality of shape primitives; wherein at least one of the weighted combinations comprises a non-linear combination of a plurality of shape primitives.

Preferably the method further comprising the steps of: obtaining a body surface using marker points from the body surface of a subject of the image; and generating a representation of the body surface by reference to a group of known body surface positions; wherein the representation is obtained by applying a weight to at least one of the plurality of known body surface positions, wherein the representation is generated from a physiological based energy equation.

Preferably further comprising the step of substantially optimizing the value of the energy equation.

Preferably further comprising the step of substantially optimizing the value of the error function.

Preferably further comprising the step of adjusting the value of the error function towards a target value.

Preferably the non-linear combination uses an algebraic expansion of the weighted combination function.

Preferably the expansion is a Taylor expansion.

Preferably the non-linear combination uses HDMR shape primitives.

Preferably a covariance between shape primitives is stored or calculated in the model and at least one pair or set of opposing action units are defined as having substantially zero covariance.

Preferably the shape primitives are blendshapes.

In a further aspect the present invent consists in a system for retargeting from an image or sequence of images, the system comprising: at least one image capture device, the at least one image capturing device capturing an image or a sequence of images; a processor programmed to track a plurality of markers in the captured image or sequence of images and programmed to determining a corresponding plurality of shape primitives, wherein the processor is programmed to evaluate an error function, the error function comprising a weighted combination of a plurality of shape primitives, at least one of the plurality of shape primitives based on a physiological characteristic of the animation and the processor is further programmed to transmit the shape primitives to an animation generator.

Preferably the processor is further programmed to: obtaining a body surface using marker points from the body surface of a subject of the image; and generating a representation of the body surface by reference to a group of known body surface positions; wherein the representation is obtained by applying a weight to at least one of the plurality of known body surface positions, wherein the representation is generated from a physiological based energy equation.

Preferably the processor is further programmed to substantially optimize the value of the energy equation.

Preferably the shape primitives are blendshapes.

In a further aspect the present invent consists in a method of retargeting from an image to an animation, the method comprising the steps of: obtaining a body surface using marker points from the body surface; and generating a representation of the body surface by reference to a group of known body surface positions; wherein the representation is obtained by applying a weight to at least one of the plurality of known body surface positions, wherein the representation is generated from a physiological based energy equation.

Preferably the method substantially optimizes the value of the energy equation.

Preferably the method adjusts the value of the energy equation towards a target value.

Preferably the body surface positions are shape primitives or FACS.

Preferably the body surface comprises a facial surface.

Preferably the marker points comprise key points of the body surface.

Preferably the marker points are markerless.

Preferably the energy equation is a weighted combination of body shape positions.

In a further aspect the present invent consists in a method of providing animation to a target model from a base model, the method comprising the steps of: receiving a motion sequence of a base model; associating the motion sequence of the base model with one or more corresponding action units from of a plurality of action units; and determining a transformation for morphing the target model to replicate or reproduce the motion sequence of the base model or a portion thereof, wherein the association comprises evaluation of an error function comprising a weighted combination of action units and wherein each action unit is based on a physiological characterization of the base model.

In a further aspect the present invent consists in a method for identifying expressions associated to emotion in an image or sequence of images, the method comprising the steps of: identifying a plurality of shape primitives associated with at least one face associated with the image or sequence of images; evaluating an error function, the error function comprising a weighted combination of the plurality of shape primitives; and relating at least one of the plurality of shape primitives to at least one of a plurality of expressions the plurality of expressions being associated with an emotion or a combination of emotions.

Preferably the method further comprising the steps of: obtaining a face surface using marker points from the face surface associated with the image; and generating a representation of the face surface by reference to a group of known face surface positions; wherein the representation is obtained by applying a weight to at least one of the plurality of known body surface positions, wherein the representation is generated from a physiological based energy equation.

Preferably further comprising the step of substantially optimizing the value of the energy equation.

Preferably further comprising the step of substantially optimizing the value of the error function.

Preferably the shape primitives comprise emotion action units.

Preferably the shape primitives comprise FACS.

Preferably the method further comprises the step of identifying the at least one face.

Preferably the face is identified using facial fiducial points.

Preferably the shape primitives are blendshapes.

In a further aspect the present invent consists in a method for identifying subject characteristics in an image or sequence of images, the method comprising the steps of: identifying a plurality of shape primitives associated with a subject of the image; evaluating an error function, the error function comprising a weighted combination of the plurality of shape primitives; and relating at least one of the plurality of shape primitives to a subject characteristic.

Preferably the method further comprising the steps of: obtaining a body surface using marker points from the body surface of the subject of the image; and generating a representation of the body surface by reference to a group of known body surface positions; wherein the representation is obtained by applying a weight to at least one of the plurality of known body surface positions, wherein the representation is generated from a physiological based energy equation.

Preferably further comprising the steps of substantially optimizing the value of the energy equation.

Preferably further comprising the steps of optimizing the value of the error function.

Preferably further comprising the steps of substantially minimizing the error function.

Preferably at least one of the plurality of shape primitives is based on a physiological characteristic of the subject of the image.

Preferably the subject characteristics comprise expressions.

Preferably the expressions are associated with, or indicative of, emotion.

Preferably including the step of identifying features on the image.

Preferably the features are associated with shape primitives.

Preferably further including the step of associating the shape primitives with a set of characteristics.

Preferably associating the shape primitives with a set of characteristics uses a look-up table.

Alternatively associating the shape primitives with a set of characteristics minimizes an error function comprising a weighted combination of emotions.

Preferably the error function comprises a combination of error functions.

Preferably the plurality of error functions relate to physiological characteristics.

Preferably the shape primitives are blendshapes.

In a further aspect the present invent consists in a method of retargeting from an image or sequence of images, the method comprising the step of evaluating an error function, the error function comprising at least one term associated with a physiological characteristic of the subject of the image or sequence of images.

Preferably the method further comprising the steps of: obtaining a body surface using marker points from the body surface of the subject of the image; and generating a representation of the body surface by reference to a group of known body surface positions; wherein the representation is obtained by applying a weight to at least one of the plurality of known body surface positions, wherein the representation is generated from a physiological based energy equation.

Preferably further comprising the step of substantially optimizing the value of the energy equation.

Preferably further comprising the step of optimizing the value of the error function.

Preferably further comprising the step of adjusting the value of the error function towards a target value.

It is understood that other configurations of the subject technology will become readily apparent to those skilled in the art from the following detailed description, wherein various configurations of the subject technology are shown and described by way of illustration. The subject technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without some of these details. In some instances, structures and components are shown in block diagram form in order to avoid obscuring certain concepts of the technology.

Blendshape rigs are commonly-used animation systems that provide various degrees of user customization. For example, specific art styles, creatures with different anatomies (such as high-resolution wrinkles and/or folds) can be incorporated into a blendshape rig. Moreover, blendshape rigs can be readily transferred other animation types, such as skeleton or duster-based facial system (e.g., for contemporary game engines and rendering environments). As used herein, a blendshape model B can be defined as the weighted sum of predefined blendshape primitives (shape primitives) $B_i$, having a relationship indicated by equation (1):

$$B(w) = B_0 + \sum_{i=1}^{N} w_i(B_i - B_0) \quad (1)$$

where $B_0$ is a resting shape (e.g., a neutral face or expression), N is the number of non-resting shape primitives, and $\omega_i \in [0,1]$ is the shape weight for the i-th shape channel. As used herein, the difference between $B_i$ (not equal to 0) and $B_0$ ($\Delta B_i = B_i - B_0$) is often described as the "delta shape."

As used here, blendshape primitives (e.g., blendshapes) can refer to a parameterized geometric descriptor of an object that was pre-defined based on a state of the object. In addition, these parameter values can be altered to describe another state, where the geometric descriptors can include: a geometric location of vertices for a blendshape mesh, joint angles for rigid-body models, and/or control points for radial basis/spline interpolations or skinning etc.

In some aspects, available blendshapes can be augmented using a Facial Action Coding System (FACS), which categorizes facial movements into unique muscle driven elementary action units (AUs). This allows various facial expressions to be formed from the combination (summation) of individual action units. Thus, a blendshape rig often contains a large number of shape primitives, as is needed to anticipate a wide range of skin movements and soft-tissue interactions needed for formation of the various expressions. Further detail regarding the use of shape primitives is provided by U.S. Patent Publication No. 2008/0025569, which is incorporated herein by reference.

However, as the number of blendshapes increases, various problems arise. First, an increasing number of blendshapes introduces the possibility of having an undetermined system of equations, which can be a major problem especially for real-time marker-less performance transfer. This is due to the fact that the number of independent facial features from a marker-less tracker is often limited; hence, there may not be enough information to obtain a unique animation output solution. Second, as the number of non-orthogonal shape primitives expands, the solution can be increasingly sensitive to small amounts of noise (e.g., in the marker tracking). For example, facial expressions with slight differences can be represented from different combinations of primitives, and small inaccuracies in the tracking data can therefore produce very different animation curves.

Previous work in solving or regularizing the blendshape rig retargeting problem includes mapping the blendshape model onto linear sub-spaces, such as described by U.S. Pat. No. 6,967,658, which is incorporated herein by reference. Some retargeting methods can include principal component analysis (PCA) and/or canonical correlation analysis (CCA).

In PCA, the blendshape model is projected onto an orthogonal Eigenspace. The Eigenspace is then truncated to remove those eigenvectors with the smallest variance, thereby eliminating redundant information from the model. In CCA, reductions in regression are then performed to construct a direct relationship between the two projected sub-spaces. It can be difficult, however, to apply meaningful constraints to eigenvectors of the blendshape system during the retargeting process using either of these techniques.

Aspects of the subject technology address the aforementioned need for systems and methods that facilitate image regularization. As used herein, "regularization" generally refers to a process of introducing additional information the help solve an ill-posed problem, or to prevent data overfitting. As discussed in further detail below, the additional information can take the form of a penalty for complexity, such as restrictions for smoothness, or bounds on an error function for a blendshape model.

Figure 1A:
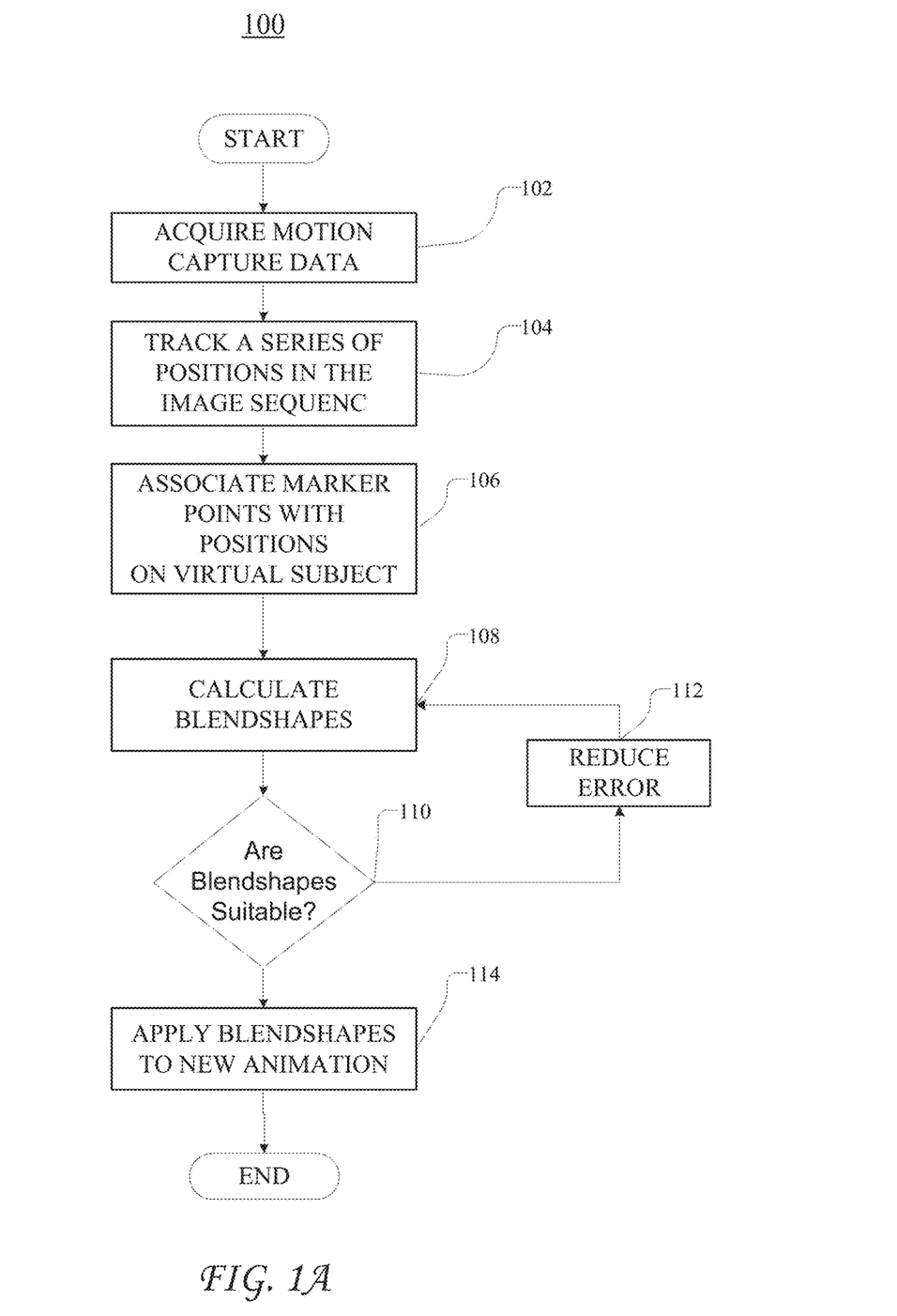
FIG. 1A is a flow diagram of an exemplary process for retargeting an image.

FIG. 1A is a flow diagram of an exemplary process 100 for retargeting an image. Such an image retargeting (or regularization) method 100 (e.g., using a non-linear blendshape model) may begin with step 102, in which motion capture data is acquired (e.g., from a camera or other source for recording a physical subject (e.g., human actor). Motion capture data can be acquired using at least one camera, and typically can involve several cameras that are used to photograph or otherwise image the physical actor. Although various image capture or recording means may be what actually captures the images including the motion capture data, such image data may be subsequently stored for access at other sources, such as data storage devices or network storage locations.

After motion capture data is acquired, process 100 proceeds to step 104 in which a series of positions in the motion capture data are tracked during one or more motions. The physical subject (e.g. human actor) may have multiple motion capture markers that are attached to (e.g., glued onto) one or more features being tracked (e.g., the actor's face). Depending on the desired implementation, each of the motion capture markers can be a passive marker, active marker, or some combination thereof. A passive marker can be, for example, a reflective optical marker that is optimized for a predetermined wavelength or band of wavelengths. In contrast, an active marker can be, for example, an active optical marker such as a light source (e.g., an LED).

Alternatively, the motion capture data can be acquired without the use of tracking markers (e.g., by tracking a series of marker-less tracking points). Regardless of whether or not tracking is performed using a marker based on marker-less tracking method, motion capture data can be processed to identify locations within the image frames that are not based on the movement or motion of the tracked subject, and which can therefore be ignored, discarded, or otherwise substantially eliminated from the data. An example of the comparison between marker-based and marker-less tracking is discussed in further detail with respect to FIG. 3A below.

In step 106, the marked (or marker-less) points on the physical subject are associated with corresponding positions on a virtual subject. Where the face of the physical subject is being tracked, for example, corresponding points are identified within the face of a virtual person or creature that is the subject of the animation.

At step 108, the motion capture data is used to determine a set of blendshapes that can be used to perform retargeting on a virtual subject or character. In some preferred embodiments, blendshape calculations are performed by calculating a set of blendshapes (e.g., from a blendshape rig) that corresponds with the motion captured data.

Blendshape calculation requires making determinations (e.g., using a solver) for each frame of motion capture data, which can include an assignment of weights for each of a plurality of predetermined facial animation states. In some aspects, such calculations can be performed in a manner that optimizes a performance metric. Depending on implementation, each predetermined facial animation state can be developed as a set of multiple virtual motion capture markers. Each of the predetermined facial animation states can be constructed in a virtual space as a 3-D representation of a facial expression by the physical actor. Examples of image retargeting performed on a variety of facial expressions by a physical actor and resulting in corresponding expressions on a virtual subject is illustrated in FIG. 3B.

As discussed in further detail below, changes in the positions of the virtual markers between the multiple predetermined facial states can follow a predetermined anatomical model. For example, changes in facial states can follow a Facial Action Coding System (FACS) model. In some aspects, facial states can be configured to extend across a predetermined range; for example, a numerical range used to characterize the facial state can be bounded. However in other embodiments, the range over which a particular facial state is bounded is not be normalized with respect to other facial states.

By way of example, blendshapes (also "shape primitives") can be created from 3-D scanned surface data and combinatorial shapes that are computer developed and/or sculpted by an artist. In some approaches, blendshapes are generated from physically and biomechanically based simulations. For example, combinational shapes may be created using physical simulators that take account for nonlinear actions and contact constraints between facial structures. The blendshapes and action units can also be FACS-based and/or based on other mathematical decompositions. In some aspects, combination shapes can be used to increase the non-linearity of the blendshape space, enabling the resulting animation to perform more complex motions. However, as discussed above, if too many combination shapes are used, the system of blendshape equations can become too non-linear, making it difficult for the solver to find a unique animation solution.

Subsequently, in step 110, a measurement of the suitability of the calculated blendshapes is determined. Blendshape suitability is based on the evaluation of one or more error functions, as will be discussed in further detail with respect to FIG. 1B below. In some aspects, one or more error functions corresponding with the calculated blendshapes can be evaluated to produce an error term or error value corresponding with the selected blendshape set. As such, suitability of a particular set of blendshapes can be evaluated by comparing an associated error term with a predetermined threshold representing a suitability cutoff (e.g., an error level below which image retargeting may be suitably performed).

If it is determined in step 110 that the calculated blendshapes are unsuitable to perform the image retargeting, process 100 proceeds to step 112, in which error associated with the blendshape set is reduced. As used herein, an error function for a particular blendshape set can include any of one or more error terms for a blendshape combination. Therefore, the reduction of error can be performed by any method or process for selecting blendshape combinations that achieve a minimum total error. In some aspects, error minimization is performed in the context of other constraints such that, for example, error minimization is achieved for the closest possible blendshape combination or acceptable solution. Thus, the retargeting or regularization of blendshapes can be understood as a process to eliminate unnecessary or erroneous blendshapes, as well as to reduce the overall blendshape space and thereby provide clarity to an artist or other user of the system.

In some instances, error minimization can be satisfactorily achieved by the selection of appropriate blendshapes. Blendshape selection can be performed by trial and error; in instances where too much error is present, however, blendshape selection may be performed manually or automatically (e.g., using one or more of the variety of error reduction techniques discussed below). In some aspects, error may be reduced by selectively increasing blendshape weights associated with a desired blendshape (e.g., to increase a probability of convergence to the desired blendshape at a given time).

Alternatively, if it is determined at step 110 that a set of selected blendshapes are suitable for image retargeting, process 100 proceeds to step 114, and the blendshapes are outputted/applied a virtual subject or character that is the focus of retargeting to create a new animation. As used herein, the process of retargeting (or "cross-mapping") is a process of adapting the recorded body or face to a target character animation. In some aspects, the target character may be a replica of the subject of the motion capture, or may be a different object or subject altogether. In some aspects, the retargeting process involves minimizing a fitting function, such as that provided by equation (2):

$$E_{fit} = \Sigma_{m=1}^{M} \|x_m - \delta(B(w); Q, R, t)_m\|^2 \quad (2)$$

where the subscript m represents the $m^{th}$ marker, $x_m$ is positions of the marker; $\delta$ is the projective transformation; Q is the camera projection matrix; and R and t are the head rotation and translation parameters, respectively. In general, the shape weights, (w) and head motion (R and t) are unknown. Therefore, minimizing the equation involves solving a system of nonlinear equations. As discussed previously, the blendshape system may be undetermined when the number of markers small compared to the number of shape primitives (e.g., when m>>n).

Figure 1B:
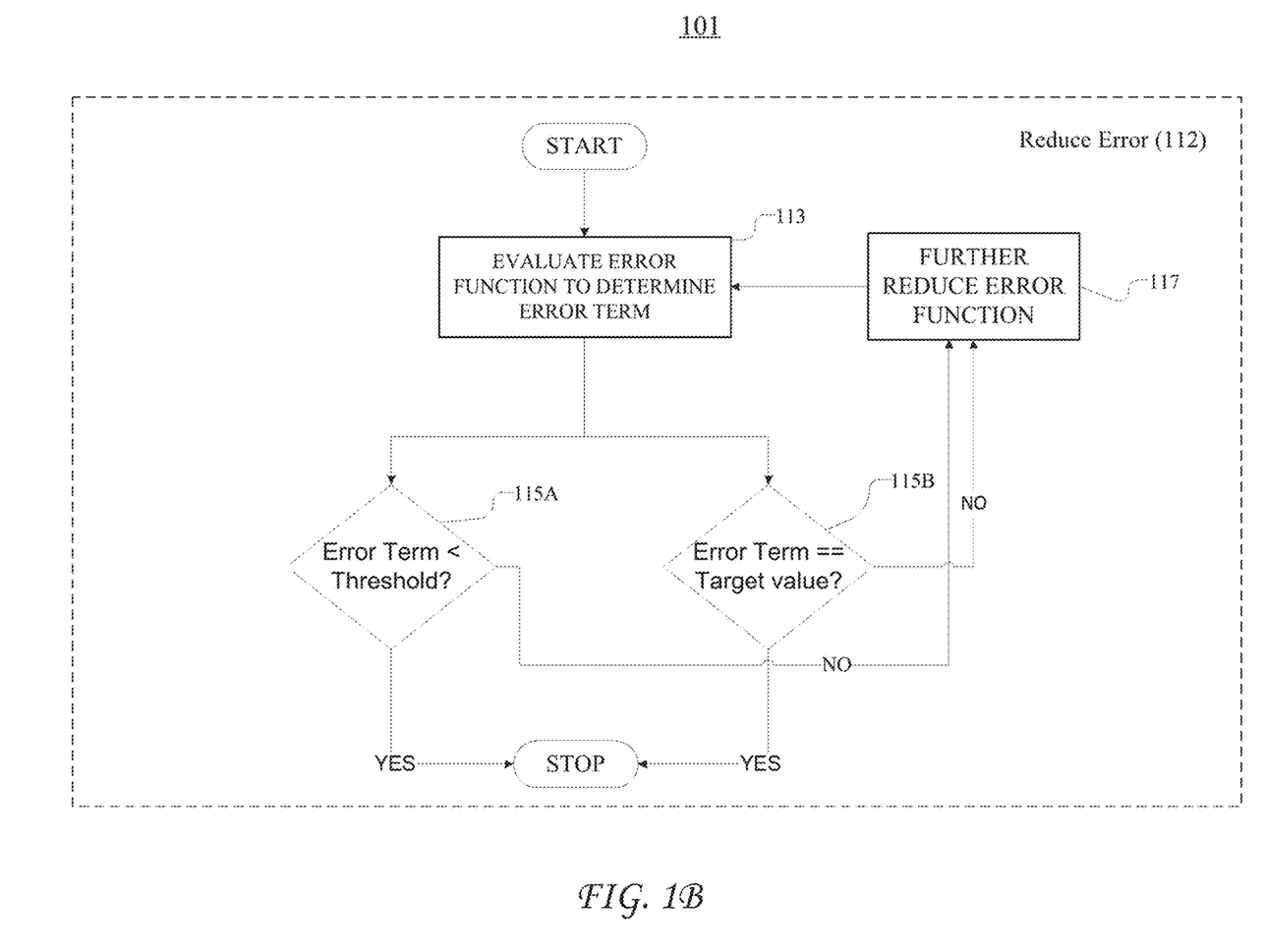
FIG. 1B is a flow diagram of an exemplary process for minimizing error for one or more blendshapes.

FIG. 1B is a flow diagram of an exemplary process 101 for minimizing error for a selected blendshape set. Process 101 begins with step 113, in which an error function describing a selected set of blendshapes is evaluated. By way of example, the error function may be evaluated to produce a value or term representing an amount of error for the error function.

Optionally, process 101 may proceed to step 115A, in which the error term can be compared to a predetermined threshold to determine, for example, if the associated blendshape set is suitable for use in performing an animation/ retargeting. In some aspects, if the error term is below the threshold, then an amount of error associated with the blendshapes set may be small enough that animation can proceed. Alternatively, if the error term is greater than the acceptable threshold, process 101 may proceed to step 117 in which the error function is further reduced.

Alternatively, after evaluation of the error function, process 101 can proceed to optional step 115B, in which an evaluation of the error function for the selected blendshapes is made by determining whether or not an error term of the associated error function is equal to a target value. The desired target value may be different depending on implementation. For example, the target value can be negative infinity, 0, infinity, or some other predetermined value.

In step 117, one or more error reduction techniques may be applied.

In one aspect, the solver may be configured to compute blendshapes in both forward and reverse time directions. Using this approach, two temporally dependent blendshape sets are computed. After which, error minimization can be performed by adjusting the relative blendshape weighting based on a correlation between the two sets (e.g., the forward-time blendshape set and the reverse-time blendshape set). That is, weighting can be adjusted where similar blendshape results are scored higher (e.g., given a higher weight).

Other time-dependent relationships can also be exploited to reduce error. For example, time-dependent blendshape calculations can be performed where weights are adjusted for a particular blendshape in a manner that is based on weights for a previously computed animation.

In another aspect, error reduction can be performed by selectively reducing the number of blendshapes for which the error function is calculated. By way of example, an L1-norm regularization method can be used to minimize a number of active shapes for a given expression. That is, by finding a minimum value of the L1-norm, a minimum number of blendshape primitives can be determined. In some aspects, an L1-norm minimization calculation can be performed in conjunction with another error function (e.g., that represents the quality of the match) and/or further error functions as required by the L1-norm minimization technique.

In some aspects, by reducing the number of active shapes at a given time, the L1-norm minimization can reduce the complexity of the system, enabling the solver to more easily find a unique solution. By reducing the number of active shapes at a given time, a number of unknown parameters can also be reduced despite the nonlinearity. As discussed in further detail below, other error minimization techniques can also be employed to reduce the number of active shapes.

Blendshape minimization can also be facilitated by the elimination of underutilized blendshapes, such as those that are less likely to be used for the expression of known or common physiological states. For example, happiness, sadness, fear, anger, surprise, and disgust are universally recognized fundamental emotions. Therefore, the muscles (or action units) associated with these universal expressions are large, robust, and generally more active. Accordingly, given an arbitrary motion sequence, action units corresponding to these essential muscles are expected to have a higher probability of actuation as compared to other nonessential action units. That is, the movement of these muscles can be prioritized, as the likelihood of these muscles being responsible for fate facial movement is greater than that of the smaller muscles.

As such, a retargeting system of the subject technology can exploit known physiological relationships by more greatly weighing blendshapes corresponding with those movements of higher instantiation probability. In some aspects, a regularization scheme can be utilized where the weighted absolute sum (e.g., L1-norm) of the blendshapes weights is penalized according to equation (3), as follows:

$$E_R = k_R \sum_{i=1}^{N} |\lambda_i w_i| \qquad (3)$$

In other aspects, an alternative weighted sum of the shape weight could alternatively be used (e.g., an L2-norm or any norm that prioritizes weight penalties for less common blendshapes). However, an advantage of the L1 norm over L2-norm penalization is that the L1 norm can produce sparse solutions due to its unique mathematical characteristics. In particular, the L1-norm can produce a smaller penalty for the same Euclidean distance with a fewer number of active bases. That is, the L1-norm error term is sensitive to the closeness of the fit in the number of bases required to get that fit. In some embodiments, the L1-norm regularization may also be referred to as "basis pursuit denoising" (BPDN) where $K_R$ can be used to control the trade-off between sparsity of the shape weights and reconstruction fidelity. That is, a high $K_R$ (in comparison to error threshold $E_R$) encourages higher reconstruction fidelity because it punishes errors in fit.

In some aspects, error minimization techniques of the subject technology can involve a regularization framework that allows intuitive control of the facial performance retargeting process. As discussed above, the retargeting process can be performed by integrating physiologically inspired regularizations and constraints (e.g., muscle priority, activation energy thresholds, and/or a rate of contraction, etc.) into the model. By way of example, combinations of certain muscles (e.g., action units) can be given an emotional meaning, such that when a group of muscles is activated, it reflects a target emotional state.

In some aspects, the retargeting process may rely on physiological foundations that reference neural patterns and/or various underlying causes or factors behind external results. For example, instead of concentrating on minimizing a number of active muscles, a broader example may look at reducing activation of neural pathways or muscle control features. This can be interpreted as reducing the energy used by the human body e.g., using an energy equation. For example, an energy efficient system may be one in which the brain only activates necessary muscles or muscle groups in order to achieve a desired facial expression.

In some aspects, a non-linear blendshape model can be utilized based on the concept of calculating or using higher dimensions of the equations used in the model; this allows common additional shapes to be introduced, thereby improving the quality of the resulting animation without extending the dimensionality of the blendshape system. In such approaches, the system minimizes the number of active bases while producing high-quality results, and it can be useful to utilize psychological interpretations (e.g., where noisy and often irrelevant channels are automatically removed).

It is understood that in some aspects energy function minimization can be performed instead of (or in addition to) error function minimization as discussed above. For example, one or more energy functions corresponding to muscle activation in a body can be used to model a retargeting process.

In practice, muscle contraction occurs as a result of conscious effort originating in the brain. That is, the brain sends signals in the form of action potentials via the nervous system to a motor neuron causing innervation of one or more muscle fibers. To initiate a contraction, a threshold of action potential needs to be reached. This action potential can be considered as an "activation energy" or "activation energy threshold" of the muscle; in other words, the minimum energy required by muscle to initiate a contraction or movement. In some aspects, an active muscle requires less effort to remain active; likewise, if the muscle was previously inactive, it would require some energy to initiate the contraction sequence. In some aspects, in order to inhibit channels that were previously idle, a temporal response term is appended to $\lambda_i$, from Equation (4), as follows:

$$\lambda_i = \lambda_{i,rank} + \lambda_{i,dyn}\left(\left(\frac{2}{w_i^{t-1}+1}\right)-1\right)^p \quad [4]$$

where $w_i^{t-1}$ is the shape weight of the previous frame, $\lambda_{i,rank}$ the $L_1$-norm content that penalizes the fitting function based on the priority of the channel and $\lambda_{i,dyn}$ is a constant controlling the strength of a temporal regularization.

It can be seen that when $w_i^{t-1}=0$, the second term in Equation [4] becomes $\lambda_{i,dyn}$, and the regularization term diminishes as $w_i^{t-1}$ increases. Moreover, parameter p can be used to adjust the curvature of the temporal response function. Therefore, changing the value of p changes the sensitivity of the response function to earlier weightings. For example, a high p value results in a strong proclivity to use the same shape weight for even a small correlation measurement (e.g., when tracking a face). That is, if the muscle is active, is likely to stay active. It should be understood that the exact format of the response function shown in Equation [4] can be varied to change the dynamics of activation energy, without departing from the scope of the subject technology. It is further understood that different response functions can be used, for example, depending on the desired implementation and/or may be varied to suit the physiology on the body of the desired animation.

In another aspect, a rate of reaction (or action) of various action units (AUs) or blendshapes is considered in the retargeting process. By way of example, different facial muscles may be known to contract at different rates, such as the levator palpebrae superioris muscles which are responsible for raising the eyelids. To improve retargeting, the solver can be modified to adhere to various physical constraints or characteristics. In some aspects, this can be achieved by introducing a temporal smoothing function that is implemented based on a rate of change of each action unit. By way of example the smoothing function may be represented as:

$$E_S = k_S \sum_{i=1}^{N} \frac{1}{s_i}(w_i - \overline{w}_i)^2 \quad [5]$$

where $\overline{w}_i$ represents a running average of the shape weight $w_i$, $k_s$ is a global smoothing parameter and $s_i$ is a rate of change of the action unit. By assigning experimentally determined $s_i$, Equation [5] can be used to prevent physically unrealistic motions. Additionally, in some aspects the smoothing function can also facilitate removal of jittering artifacts, e.g., that can result from poor input data.

In some implementations, regularization parameters can be adjusted based on non-physiological considerations. For example, an artist may dean up an animation curve based on her own personal preferences and past experiences, such as, tuning various regularization parameters based on those preferences.

In some aspects, combining the use of strain-rate, which constrains the speed of activation and deactivation, with the FACS based shapes allows the strain-rates to be pre-measured. This means that they can be introduced and/or applied to a new video sequence, for example, without any video specific tuning process. Strain-rate based constraints can be derived from studying the actual motion of the faces, i.e., biomimicry.

In some implementations a given linear combination of blendshapes and/or FACS action units may be insufficient to reproduce all desired motions of an expressive feature, such as a human face. This is because of the large range and nonlinear motion of the retargeted tissues (e.g., the facial tissues). For example, when lips pucker the resulting expression is not a simple summation of two delta shapes. Most action units are not mutually orthogonal; that is their effects cannot be completely separated or treated independently. As such a corrective delta shape can be used to achieve a more accurate expression. In some approaches, corrective blendshape (e.g., corrective deltas) can be introduced by the user.

In other aspects, one solution to this problem is to create a combinatorial blendshape (e.g., a shape primitives or blendshape that describes the combined influence of different action units), and that can be created to describe the co-varying outcome. However, the addition of combinatorial blendshapes increases the dimensionality of the blendshape function, which in turn can result in an unwieldy dimensionality for the blendshape rig. Additionally, the combined shapes are regarded as separate controls and therefore dynamic transitions between primary and combined action units may not be straightforward. For example, potentially resulting indirect solutions can often result in a nonlinear solver getting trapped in a local minimum, e.g., not adjusting the norm correctly. In addition, applying any temporal regularization on the combined channels can become problematic.

In some aspects, rather than extending the dimensionality of the blendshape space the shape space can be modeled as a nonlinear contribution to the blendshape model. That is, it can be possible to reduce the number of blendshapes (or action units) required by the model, for example, by incorporating mixtures of the units instead of requiring new units. In some approaches, this can be achieved by using a high dimensional model representation (HDMR), which takes advantage of a mathematical expression of nonlinear combinations that can be solved to determine the base action units or blendshapes. If implemented, such methods may require the calculation of an inverse that can be extended to multiple equations. Other nonlinear (high dimensional) interpolation methods can also be used without departing from the scope of the technology. By way of example, radial basis interpolation and/or Lagrange interpolation may be performed on an N-dimensional hypercube. In some implementations, one advantage of HDMR is that it is much faster and can yield more predictable results. In the case of radial basis interpolation, the interrelation between points can be unpredictable, especially when there are a large number of scattered points.

By way of example, for hypercubes, increasing a number of shape combinations can exponentially increase the complexity of interpolation. In some aspects, the expression chosen should be differentiable, or able to be expressed algebraically to allow the inverse to be performed. In some aspects, retargeting can be more complex than the construction of a face because it is working backwards, e.g., from the resulting image to an approximation of what caused it.

By way of further example, instead of extending the dimensionality the blendshape space, the shape space can be modeled as a combination of nonlinear contributions to the blendshape model, e.g., using the concept of a HDMR. Based on the Taylor expansion, the blendshape function B can be expanded into:

$$B = B(\overline{w}) + \sum_{i=1}^{N} \frac{\partial B(\overline{w})}{\partial w_i}(w_i - \overline{w}_i) + \sum_{i,j=1}^{N} \frac{1}{2!} \frac{\partial^2 B(\overline{w})}{\partial w_i \partial w_j}(w_i - \overline{w}_i)(w_j - \overline{w}_j) + \sum_{i,j,k=1}^{N} \frac{1}{3!} \frac{\partial^3 B(\overline{w})}{\partial w_i \partial w_j \partial w_k}(w_i - \overline{w}_i)(w_j - \overline{w}_j)(w_k - \overline{w}_k) + \ldots \quad [6]$$

Setting $\overline{w}=0$ and approximating the partial derivatives using finite difference scheme as:

$$\frac{\partial B(\overline{w})}{\partial w_i} \approx B_i - B_0 \quad [7]$$

$$\frac{\partial^2 B(\overline{w})}{\partial w_i \partial w_j} \approx B_{ij} - B_i - B_j + B_0$$

$$\frac{\partial^3 B(\overline{w})}{\partial w_i \partial w_j \partial w_k} \approx B_{ijk} - B_{ij} - B_{jk} - B_{ik} + B_i + B_j + B_k - B_0$$

gives:

$$B = B_0 + \sum_{i=1}^{N} w_i(B_i - B_0) + \sum_{\substack{i,j=1 \\ i<j}}^{N} w_i w_j(B_{ij} - B_i - B_j + B_0) + \sum_{\substack{i,j,k=1 \\ i<j<k}}^{N} w_i w_j w_k(B_{ijk} - B_{ij} - B_{jk} - B_{ik} + B_i + B_j + B_k - B_0) + \ldots \quad [8]$$

where the first two terms of this expression represent the linear blendshape model. The additional terms can be interpreted as a nonlinear extension to the blendshape approach. That is, the third term is a sum (over all the blendshapes N) of the nonlinear effect of combining each set of two blendshapes. Similarly, the third term combines the nonlinear effect of triplets of blendshapes and so on. This means that a solver can now solve based on combined blendshapes, or basic shapes, greatly improving the use of a similar set of basic shapes.

In the case where the shape primitives are orthogonal, i.e.:

$B_{ij} - B_0 = \Delta B_i + \Delta B_j$ and $B_{ijk} - B_0 = \Delta B_i + \Delta B_j + \Delta B_k$ for all ij and k, the HDMR blendshape model reduces back to the original linear model. Therefore, higher order terms are only required when the corresponding channels covariate. Since most action units are already spatially isolated, higher-order combinational shapes are only needed for action units there on the same region of the face. Furthermore, according to the sparsity-of-effects principle, a nonlinear system is usually dominated by main effects and lower order interactions, and $2^{nd}$ and $3^{rd}$ order interactions (e.g. covariates of two and three channels respectively) are generally sufficient to generate most expressions. However, the system may be expanded or continued higher-order effects were required, for example, by simply calculating a further term of the expansion.

In some aspects, the nonlinear equation can be further extended to allow incremental and combinations of incremental shapes to be added. Incremental shapes may add another layer of nonlinearity to the existing combination shapes to allow better control the image formation. Depending on the structure of the shape increments, interpolators such as radial basis function and/or tensor product splines can be used. In some aspects an alternative to this method, which has an expensive computational cost, may use regression-based surrogate models to speed up the process. An example is the partial least squares regression (PLSR) which is been shown to speed up the biomechanically generated facial expressions. PLSR is a statistical system that can be used emulate a variety of complex equations. The facial expressions are normally generated before applying PLSR.

In some aspects, blendshapes or action units may have opposite influences, for example, that are not physically able to be co-activated. For example, "eyes left" and "eyes right" are contradicting and therefore would not typically be activated simultaneously. Similarly "cheeks puff" and "cheeks suck" are also contradictory. To prevent co-activation of opposing shape controls, combinations of these action units can be replaced by the resting state. For instance, a lookup correlation table or matrix could be included to track covariance between muscle groups. As a result, co-activating the shapes would return to neutral, and in embodiments where this is used with BPDN, which targets the most sparse solution, will prevent the solver from activating these opposing channels concurrently.

In some aspects, facial performances may be tracked semi-manually. However, more automated trackers (e.g., based on cascade regression) can also be used. Combined with an identity database this allows real-time person-independent performance tracking and retargeting. In some aspects, a marker list regression-based tracker could benefit from the proposed regularization method as a number of features being tracked are limited and results are often noisy. In some embodiments the increase computational complexity of the nonlinear blendshape models can be reduced by application of further constraints to prevent unnatural animated expressions. Because FACS action units are spatially isolated, they can be placed into regional groups and linear inequality constraints can be applied to these spatial regions. For example, each region can be restricted within the convex whole of the blendshape space by constraining the combination or some of shape weights to be less than or equal to one. If the solution space is within a convex hull, it is almost always possible to find a unique solution when the starting point is also within the convex hull.

In some aspects the inequality constraints can be implemented using the method of Lagrange multipliers with slack variables. Langrange multipliers are a strategy for finding the local maxima and minima of the function subject to equality constraints. The method can be further extended to allow inequality constraints by adding a slack variable to the multiplier.

The combined use of the regularization techniques and the nonlinear solver allows neutral replacement shapes to be efficiently implemented without any (or little) additional computational work. Since an L-1 norm regularization look for the lowest set of active weights, it will try to avoid any combinational shapes unless there is enough energy (or error) to drive it toward those combinations. The neutral replacement method essentially removes that energy by replacing those combinations with a neutral shape, thereby preventing co-activation of those weights without affecting the activation property of individual shaped channels.

Figure 2:
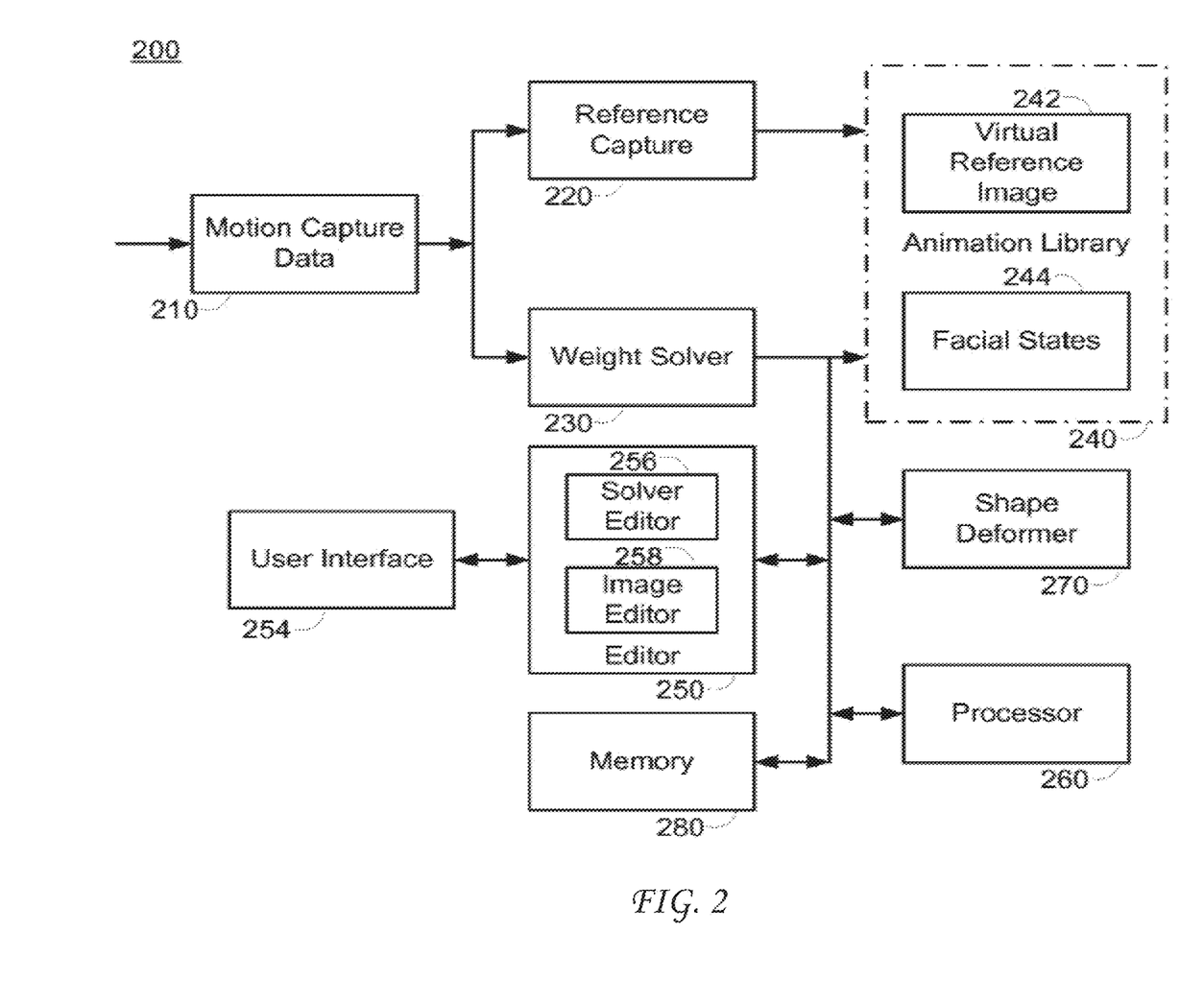
FIG. 2 is a simplified block diagram of an exemplary animation system that may be used to implement image retargeting.

FIG. 2 is a simplified functional block diagram of an exemplary animation apparatus 200 used to implement some aspects of the image retargeting technology. Animation apparatus 200 includes a storage device 210 configured to store motion capture data. The motion capture data can be stored, for example, as a series of frames of motion capture data. The motion capture data can include data that has been stabilized to remove certain movements (e.g., head movements such as tilt, rotation, and shift). Storage device 210 can be virtually any type of electronic storage device, such as solid state memory, RAM, magnetic memory, hard disk memory, magnetic tape, optical memory, optical disks, or some combination thereof.

Storage device 210 can be coupled to a reference capture module 220 and a weight solver 230. The reference capture module 220 can be configured to establish a relationship between a predetermined expression from a physical actor/character captured in image data (including the motion capture data) to a corresponding predetermined facial expression of a virtual actor/character. The reference capture module 220 can be coupled to the weight solver 230, as well as to an animation library 240.

The reference capture module 220 is typically utilized during a calibration phase that occurs prior to filming of the motion sequence that forms the basis for the motion capture data. In particular, the reference capture module 220 can be used to establish a relationship or mapping between a captured expression of a physical actor and a corresponding predetermined expression stored as a virtual reference image 242 in animation library 240. An initial image captured of the physical actor in a predetermined pose may reflect a predetermined expression. The initial image is typically a three-dimensional image capture of the physical actor. The predetermined expression may be, for example, a rest pose in which the physical actor is substantially expressionless. Of course, the predetermined expression is not limited to a rest pose and may be nearly any pose or expression.

The virtual reference image 242 within the animation library 240 is configured to store a predetermined facial expression that can correspond to the predetermined expression from the physical actor. The virtual reference image 242 can include, for example, the information and data derived from an animated, virtual head having virtual markers placed at points corresponding to the placement points of motion capture markers on the head of the physical actor. In one embodiment, the virtual reference image 242 can be generated using Non-Uniform Rational B Splines (NURBS) to produce a mathematical representation of the 3-D geometry corresponding to the physical head. The appearance of the virtual NURBS head model need not be identical to the appearance of the physical model. Indeed, in some embodiments, the virtual actor need not be based on a real actor, but may instead be a model of a stylized animation character.

In another embodiment, the virtual reference image 242 can be generated as a three-dimensional shape or surface defined by multiple polygonal meshes. The virtual markers can be positioned on the surface of the virtual head. The position of each of the virtual markers can be configured to remain on the same point on the surface of the mesh defined by the NURBS curves even when the mesh is deformed.

The reference capture module 220 can be configured to map the positions of the motion capture markers from the first 3-D captured expression from the physical actor to the position of the virtual markers on the virtual reference image 242. In one embodiment, the reference capture module 220 automatically registers and aligns the captured predetermined expression to the virtual reference image 242 prior to performing the mapping. For example, the reference capture module can be configured to modify the registration and alignment of the captured motion capture data relative to the virtual reference image 242 based on an alignment or registration metric. The alignment registration metric can be, for example, a minimal distance, least square, or some combination thereof that relates the position of the motion capture markers in the captured image to the position of the virtual markers in the virtual reference image 242.

In another embodiment, registration and alignment of the captured predetermined expression to the virtual reference image 242 can be semi-automated or manual. For example, a user may utilize a user interface 254 to manipulate a display of the captured predetermined expression that is overlaid on a display of the virtual reference image 242 in order to substantially align the motion capture markers of the physical actor to the virtual markers on the virtual reference image 242. The user may, for example, utilize the user interface 254 to translate, rotate, scale, or otherwise register and align the motion capture markers to the virtual markers. The user may then initiate the reference capture module 220 to perform the mapping operation. The mapping operation result in an approximate correlation of a surface of the physical actor—as defined by the placement of the motion capture markers—to a surface of the virtual actor.

The motion capture data 210 for captured images other than the predetermined expressions are coupled to the weight solver 230. Again, as before, the captured images are typically three-dimensional images or convey three-dimensional information. Weight solver 230 is coupled to the animation library 240 and uses a virtual expression library 244, as well as the virtual reference image 242 to generate a facial animation solution.

As discussed above, weight solver 230 can be configured to determine the relative weight applied to each blendshape component of the facial state in animation library 240 that combine to reproduce the expression represented by the motion capture data. In one embodiment, weight solver 230 can be configured to determine control values, such as relative weight or blend shape weights for each frame of motion capture data 210. Weight solver 230 can be configured to produce a set of weights or control values based on performance metrics such that the virtual markers substantially match or otherwise align with the motion capture markers. Additionally, weight solver 230 can re-determine or otherwise re-compute the weights for each frame of motion capture data.

In the motion capture data corresponding to the movements of the physical actor, muscle activations cause the motion capture markers to translate in space. Weight solver 230 determines weights to deform the scanner surface of the virtual actor to cause the virtual markers to translate in space by a corresponding amount. For each frame of motion capture data, the weight solver 230 can be configured to find a set of weight values (e.g., blend shape weight values) that align the virtual markers with a motion capture data.

As discussed above, weight solver 230 can also determine blend shape weight values, so as to minimize error functions associated with the chosen blend shapes. In some aspects, activation thresholds may be used to eliminate less likely blendshapes or to prioritize blendshapes that have a higher probability of activation.

Figure 3A:
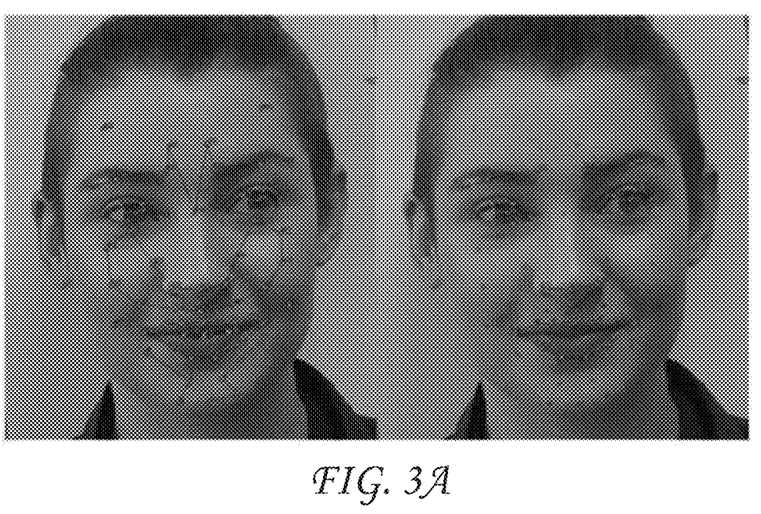
FIG. 3A illustrates a side-by-side comparison of a markerless image of a physical subject with an exemplary image of the same physical subject upon which markers have been distributed.
Figure 3B:
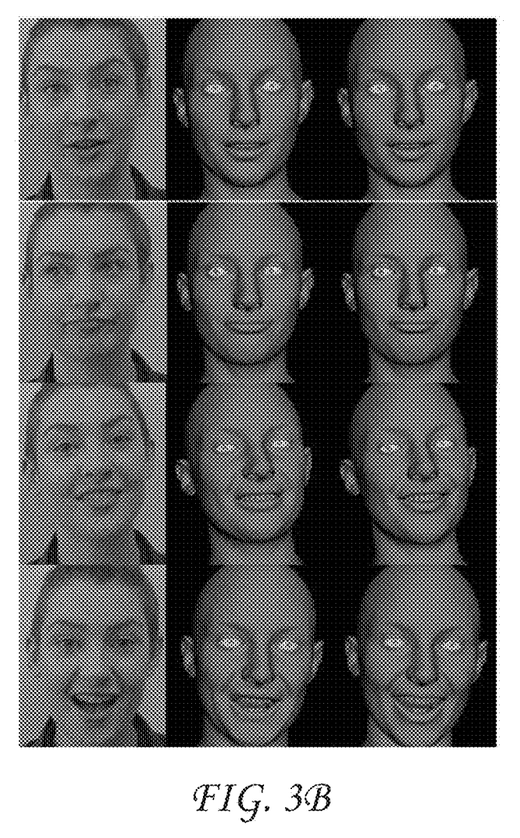
FIG. 3B illustrates several examples of image retargeting between a physical subject who has performed different motions and a virtual subject retargeted in accordance with each of the different motions.

FIG. 3A illustrates an example of a physical actor on which marker-based tracking is performed for the tracking of facial features (left). As further illustrated, FIG. 3A also depicts an example of virtual or marker-free tracking (right). Together, FIG. 3A illustrates a side-by-side comparison of a marker-less image of a physical subject with an exemplary image of the same physical subject upon which markers have been distributed.

FIG. 3B illustrates several examples output by a retargeting process of the subject technology. In particular, an expression of a first subject (e.g., a physical subject of left column) is retargeted onto a second subject (e.g., a virtual subject of the center and right columns).

While this disclosure has concentrated on the example of a facial solver it may be applied to a range of physiological bodies including human and non-human animals and animal parts. Similarly embodiments may be applied to non-animal objects where the physiological features are instead related to the mechanical or alternative characteristics of the objects.

While this disclosure has focused on retargeting of an image from a motion or image capture device in some embodiments the process could be, in part, reversed to provide an object with animation based on a series of commands. The desired blendshapes, or emotions, or other input can be provided to a processing means, such as a processor or computer, which follows one or more of the described steps to animate an object. For instance the use of the physiological blendshapes will allow an animator to adjust the animation in a straightforward manner if it appears incorrect.

In a further embodiment the system and/or method may be applied to alternative applications. For instance the system may be used to identify expressions, in an image or motion sequence. The detected expression can then be used an indication of or suggesting an emotional state. The expressions, shape or movement of the subject (e.g. a face) can be associated with an emotion state by, for instance, a look-up table or database. In some cases the correlation or association may be formed by knowledge of the physiological system underlying the emotion, for example the underlying muscles or facial structure, or other physical structure or model. In a preferred embodiment the system would identify a series of facial fiducially points, most commonly using a markerless tracking system. The particular points may vary depending on which expressions are being sensed and subsequently emotions identified or may be general (e.g. the corners of lips).

Using the methods as described herein these images or image sequences may be solved for the blendshape, preferably FACS action units, weight values. When the blendshapes or FACS are identified these may be projected, or compared to (e.g. through a look-up table) to known emotional blendshapes or emFACS (e.g. surprise is a combination of AU1+AU2+AU5), or a similar combination of blendshapes. This process is helpful where the solving process reduces the number of blendshapes or action units so as to give a dearer picture of the potential emotion. This means that the physiological nature of the system is used to identify expressions and thus emotions in a facial image. Alternative subject characteristics may also be determined in a similar method. These embodiments use a model of the physical emotion (characteristic) response of the subject and the physiological basis of the system to correlate the image with the subject characteristics. Alternative characteristics may reflect an underlying nature of the subject, for instance health, muscle, or physical parameters (e.g. exercise). In an embodiment the association of the blendshapes to emotions may be used to create an error term. That is the blendshape choice may be modified if the emotion combination is inconsistent.

Although aspects of this disclosure concentrate on the example of a facial solver, it is understood that aspects of the technology can be applied to a range of physiological bodies, including but not limited to human and nonhuman animals, and/or animal parts. Similarly, aspects of the technology may be applied to non-animal objects with physiological features that are instead related to the mechanical alternative characteristics of the objects.

Additionally, although aspects of the disclosure focused on retargeting of an image from a motion or image capture device, it is understood that aspects of the technology could be implemented to provide an object with animation based on a series of commands. For example, the desired blendshapes or emotions, or other input can be provided to a processing means, such as a processor or computer, which falls one or more of the described steps to animate object. For instance, the use of the physiological blendshapes can allow an animator to adjust animation in a straightforward manner if it appears incorrect.

In an alternative embodiment, the system and/or method can be applied to alternative applications. For instance, aspects of the technology may be used to identify expressions in an image or motion sequence. Detected expressions may then be used as an indication of an emotional state. By way of example, expressions, shapes, and/or movement of the subject (e.g., a face) can be associated with an emotional state by, for example, a lookup table or database. In some cases a correlation or association may be formed by knowledge of the physiological system underlying the emotion, for example, the underlying muscles and/or facial structures, or others physical structures and/or models.

Figure 4:
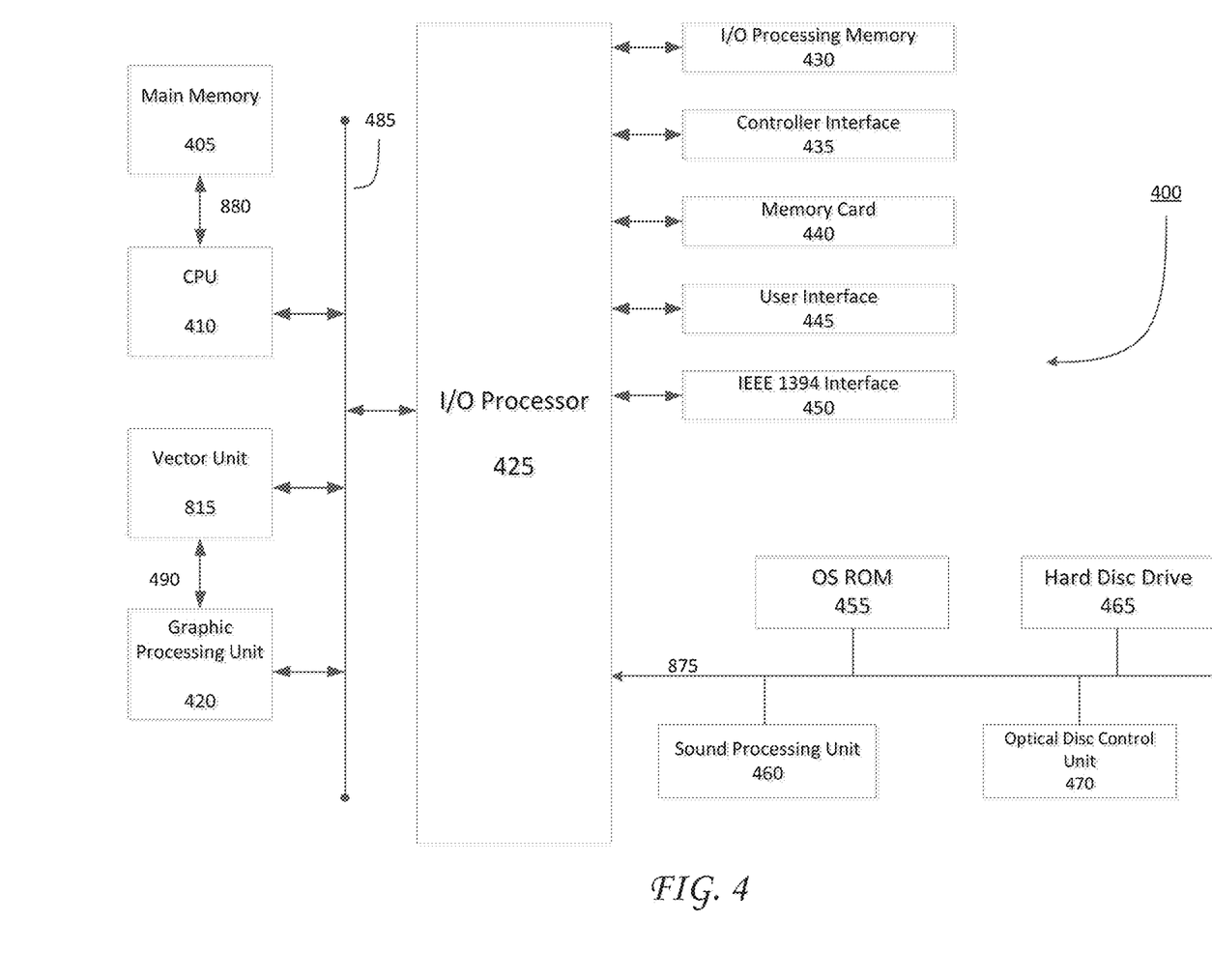
FIG. 4 illustrates an exemplary electronic system with which some aspects of the subject technology can be implemented.

FIG. 4 is a block diagram of an exemplary electronic entertainment system 400. The entertainment system 400 of FIG. 4 includes a main memory 405, a central processing unit (CPU) 410, vector unit 415, a graphics processing unit 420, an input/output (I/O) processor 425, an I/O processor memory 430, a controller interface 435, a memory card 440, a Universal Serial Bus (USB) interface 445, and an IEEE 1394 interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, or a mobile computing device or phone. Entertainment systems may contain more or less operating components depending on a particular form factor, purpose, or design.

CPU 410, vector unit 415, graphics processing unit 420, the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4$, LTE, 3G, and so forth). The I/O processor 425 of FIG. 4 primarily controls data exchanges between the various devices of the entertainment system 400 including the CPU 410, the vector unit 415, the graphics processing unit 420, and the controller interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the IEEE 1394 interface 450 such as wireless transceivers, which may also be embedded in the system 400 or as a part of some other component such as a processor.

A user of the entertainment system 400 of FIG. 4 provides instructions via the controller interface 435 to the CPU 410. For example, the user may instruct the CPU 410 to store certain game information on the memory card 440 or other non-transitory computer-readable storage media or instruct a character in a game to perform some specified action.

It will be appreciated that these systems and methods are novel, as are applications thereof and many of the components, systems, methods and algorithms employed and included therein. It should be appreciated that embodiments of the presently described inventive body of Work can be implemented in numerous ways, including as processes, apparatus, systems, devices, methods, computer readable media, computational algorithms, embedded or distributed software and/or as a combination thereof. Several illustrative embodiments are described below.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

What is claimed is:

1. A computer-implemented method for depiction of complex geometries, the method comprising:
    acquiring a motion capture data sequence of a subject, the motion capture data including body position tracking data of the subject having at least one body surface;

modeling the motion capture data as an animation model that includes a set of a plurality of corresponding blendshapes associated with regularization parameters, wherein the blendshapes include at least one non-linear term and at least one linear term;

adjusting the regularization parameters based on one or more physiological factors associated with activation of neural pathways and non-physiological factors, wherein a number of the blendshapes in the set is reduced by eliminating at least one blendshape associated with an erroneous blendshape combination, wherein the regularization parameters are adjusted based on an energy function representing the activation of neural pathways that includes a threshold action potential; and generating a representation of the at least one body surface of the subject based on the reduced set of blendshapes within the animation model in accordance with the motion capture data and adjusted regularization parameters.

2. The method of claim 1, wherein the non-linear term represents an incremental shape.

3. The method of claim 1, wherein the non-linear term is a sum of a non-linear effect of combining one or more of the plurality of blendshapes.

4. The method of claim 3, wherein the non-linear term reduces a number of blendshapes used for modeling.

5. The method of claim 1, wherein the physiological factors include human or non-human bodies or parts.

6. The method of claim 1, wherein the physiological factors includes characteristics of a muscle or collection of muscles.

7. The method of claim 1, wherein the regularization parameters are adjusted to reduce activation of the neural pathways.

8. The method of claim 1, wherein the non-physiological factors include a user preference.

9. The method of claim 1, wherein generating the representation includes evaluating an error function comprising a weighted combination of the regularization parameters.

10. The method of claim 9, further comprising updating a temporal dependence of weights used for the weighted combination.

11. The method of claim 9, wherein the weighted combination of the regularization parameters are based on relative probability of activation.

12. The method of claim 9, wherein the regularization parameters are adjusted by constraining the weighted combination of the regularization parameters to be less than or equal to one.

13. The method of claim 9, wherein the blendshapes include at least one non-linear term expressed as an algebraic expansion of the weighted combination of the regularization parameters.

14. The method of claim 13, wherein the algebraic expansion is a Taylor expansion.

15. The method of claim 1, wherein the regularization parameters are adjusted by introducing a corrective delta shape by a user.

16. The method of claim 1, wherein the regularization parameters are adjusted by introducing a temporal smoothing function based on a rate of reaction of the blendshapes.

17. The method of claim 1, wherein the regularization parameters are adjusted to have a temporal dependence expressed as a response curve.

18. The method of claim 1, wherein generating the representation includes utilizing an energy equation that reduces energy required to activate muscles.

19. The method of claim 1, further comprising storing a lookup table for covariance between muscles, wherein the regularization parameters are adjusted to prevent co-activation of opposing shapes of the muscles.

20. A system for depiction of complex geometries, the system comprising:

memory that stores instructions; and at least one processor that executes the instructions stored in memory, wherein execution of the instructions by the at least one processor:

acquires a motion capture data sequence of a subject, the motion capture data including body position tracking data of the subject having at least one body surface;

models the motion capture data as an animation model that includes a set of a plurality of corresponding blendshapes associated with regularization parameters, wherein the blendshapes include at least one non-linear term and at least one linear term;

adjusts the regularization parameters based on one or more physiological factors associated with activation of neural pathways and non-physiological factors, wherein a number of the blendshapes in the set is reduced by eliminating at least one blendshape associated with an erroneous blendshape combination, wherein the regularization parameters are adjusted based on an energy function representing the activation of neural pathways that includes a threshold action potential; and generates a representation of the at least one body surface of the subject based on the reduced set of blendshapes within the animation model in accordance with the motion capture data and adjusted regularization parameters.

21. A non-transitory computer-readable storage medium, having embodied thereon a program executable by a processor to perform a method for depiction of complex geometries, the method comprising:

acquiring a motion capture data sequence of a subject, the motion capture data including body position tracking data of the subject having at least one body surface;

modeling the motion capture data as an animation model that includes a set of a plurality of corresponding blendshapes associated with regularization parameters, wherein the blendshapes include at least one non-linear term and at least one linear term;

adjusting the regularization parameters based on one or more physiological factors associated with activation of neural pathways and non-physiological factors, wherein a number of the blendshapes in the set is reduced by eliminating at least one blendshape associated with an erroneous blendshape combination, wherein the regularization parameters are adjusted based on an energy function representing the activation of neural pathways that includes a threshold action potential; and generating a representation of the at least one body surface of the subject based on the reduced set of blendshapes within the animation model in accordance with the motion capture data and adjusted regularization parameters.

* * * * *